UNITED STATES PATENT OFFICE.

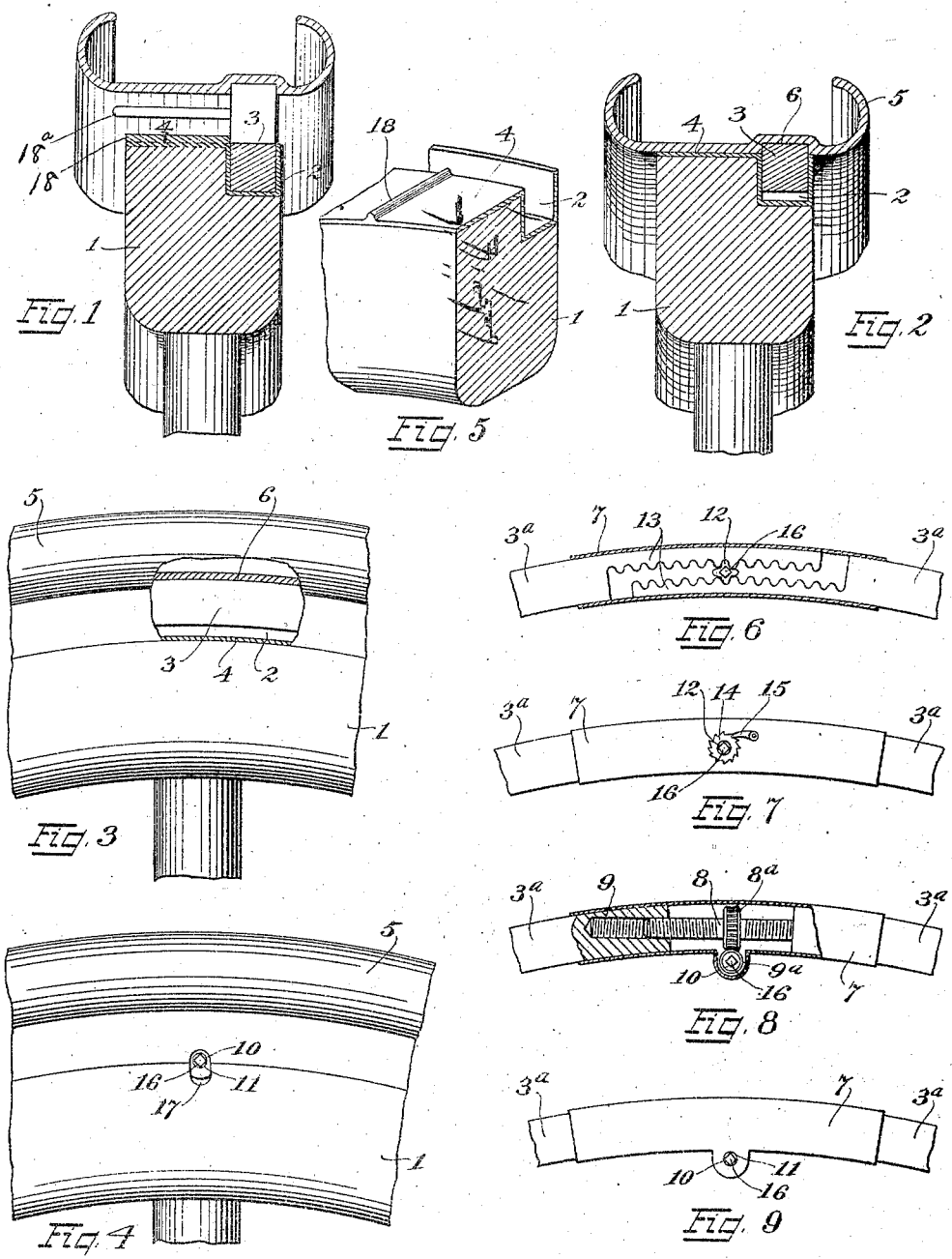

FREDERICO N. BENDELARI, OF CLEVELAND, OHIO.

DEMOUNTABLE RIM FOR VEHICLE-WHEELS.

967,599.  Specification of Letters Patent.  Patented Aug. 16, 1910.

Application filed October 15, 1908. Serial No. 457,792.

*To all whom it may concern:*

Be it known that I, FREDERICO N. BENDELARI, a citizen of the United States, residing at Cleveland, in the county of Cuyahoga and State of Ohio, have invented certain new and useful Improvements in Demountable Rims for Vehicle-Wheels, of which the following is a specification.

My invention relates to improvements in demountable rims for vehicle-wheels, and, more particularly, to means for attaching the tire rim to the felly of the vehicle-wheel such as an automobile or the like, the same being adapted to secure the rim, together with the tire carried thereby, upon the wheel-felly in proper position.

The primary object of the invention is to provide improved means whereby the rim and attached tire may be readily mounted upon and attached to or detached and demounted from the felly of the wheel while the tire is in an inflated or expanded condition.

Another object of the invention is to provide a generally improved device of this class which will be exceedingly simple in construction, cheap of manufacture, and efficient in use.

The tire-rim may be of any suitable and convenient construction, but in the present embodiment of the invention and for the purpose of this application, I have shown a rim of the clencher type, the device being admirably adapted for use in connection with a rim and tire of this class or type.

With the above mentioned objects in view, the invention consists in the novel construction, arrangement, and combination of parts, hereinafter described, illustrated in the accompanying drawings, and particularly pointed out in the appended claims.

Referring to the drawings forming a part of this specification, Figure 1 is a cross sectional view of the felly and demountable rim portion of a wheel constructed in accordance with my invention. Fig. 2, a cross sectional view of the same with the improved demountable rim mounted in its normal position upon the wheel and locked thereon. Fig. 3, a side elevation of the felly with demountable rim attached, a portion of the rim and felly portions being broken away for the purpose of clearer illustration of the parts. Fig. 4, a similar view of the portion of same provided with expanding device connected to the ends of the expanding ring. Fig. 5, a detail perspective view of a section of the wheel-felly with rim and tire removed. Fig. 6, a side elevation of a form of ring expanding device connected to the ends of the expanding ring, the supporting-sleeve being shown in longitudinal section. Fig. 7, a side elevation of the supporting-sleeve provided with pawl and ratchet mechanism for holding the ring expanding device in adjusted position. Fig. 8, a side elevation of the preferred form of ring expanding device, a portion of the supporting-sleeve being broken away and one of the attached ends of the expanding ring being sectioned for the purpose of clearer illustration of the parts. Fig. 9, a side elevation of the supporting-sleeve carrying this form of ring-expanding device and the connected ends of the expanding ring.

Similar numerals of reference designate like parts throughout all the figures of the drawings.

The vehicle-wheel felly 1, is provided with a circumferential groove 2, adapted to receive and contain an expanding ring or locking member 3, hereinafter described. The felly 1, is preferably provided on its outer periphery with a metallic band or fixed rim 4, suitably bent or flanged to conform to and form a lining for the groove 2, of the felly 1. The tire-rim 5, is adapted to be mounted and attached to or detached and demounted from the felly of the wheel by means of the expanding ring or locking member 3, adapted to be expanded or contracted within the groove by suitable expanding and contracting means, two forms of which means are shown in the accompanying drawings and hereinafter described.

When it is desired to secure the tire-rim 5, upon the wheel-felly 1, the expanding ring or locking member 3, is adapted to be contracted within the groove 2, so that its outer peripheral surface will be flush with the peripheral surface of the wheel felly 1. The tire-rim is then free to be slipped or mounted upon the wheel felly after which it is securely attached or locked thereon by expanding the expanding ring or locking member 3. The expanding ring or locking member may engage with the inner periphery of the tire-rim 5, in any suitable and convenient manner, preferably, by providing an inner circumferential groove or pocket 6, adapted to receive and contain the expanding ring or locking member when the latter is in its expanded position. The ends 3ª, of the expanding ring or locking member 3, are, preferably, provided with a supporting-sleeve 7, adapted to slidably receive and contain the ends 3ª, and carrying the expanding device and adjacent parts in their proper relative position.

The expanding ring or locking member 3, is, preferably, expanded and contracted by means of a threaded member 8, provided at its ends with oppositely-disposed or right and left handed threads taking into and operating within internally-threaded bolt-openings 9, in the ends 3ª, of the expanding ring or locking member. The threaded member 8, is provided with a pinion 8ª, meshing with a worm-gear 9ª, carried upon a transverse shaft or pin 10, said transverse shaft or pin 10, being carried in suitable bearing-openings 11, in the supporting-sleeve 7. If desired, the expanding ring or locking member 3, may be expanded by means of a transverse expanding pinion-bolt 12, interposed between and engaging with overlapping racks 13, formed at the ends of the expanding ring or locking member as shown most clearly in Fig. 6, of the drawings. The ends of the expanding pinion-bolt 12, are carried by and mounted in suitable bearing-openings in the supporting-sleeve 7, and as a means for securing the pinion-bolt 12, as against a rearward rotation or movement after the expanding ring has been moved to an expanded position, the pinion-bolt 12, may be provided with a ratchet wheel 14, adapted to be engaged by a pawl 15, on the outside of the supporting-sleeve 7. The ends 16, of the expanding bolts 8, and 12, are adapted to be engaged and manipulated by any suitable and convenient key for the purpose, a slot 17, (see Fig. 4) being provided in the side of the felly 1, for the reception of the operating key just referred to.

As a means for preventing any sliding or creeping of the tire-rim of the wheel-felly 1, the latter may be provided with a plurality of transverse ribs 18, in the present instance, formed integral with the metallic band or fixed rim 4, (see Fig. 5), said transverse ribs 18, being adapted to take into and engage with similarly formed transverse grooves 18ª in the inner periphery of the tire-rim 5.

Having thus described my invention, without having attempted to set forth all the forms in which it may be made, or all the modes of its use, I declare that what I claim and desire to secure by Letters Patent, is:—

1. A demountable rim for vehicle wheels, comprising a wheel-felly, a fixed rim provided with transverse ribs and a circumferential groove adapted to be closed by the tire-rim, a split expanding ring adapted to be contracted within and to fill said groove and having its ends connected to and carrying a radially movable expanding device, and a tire-rim normally closing said groove and engaged by said transverse ribs and expanding ring.

2. A demountable rim for vehicle wheels, comprising a fixed rim carrying anti-creeping members and a normally concealed peripheral radially expanding ring, a tire-rim engaged by said anti-creeping members and provided with an inner circumferential groove normally closed by said fixed rim and engaged by said ring when the latter is in its expanded position, and means independent of said fixed rim carried by and connected to the adjacent ends of said ring for expanding the latter.

In testimony whereof I have affixed my signature, in presence of two witnesses.

FREDERICO N. BENDELARI.

Witnesses:
GEO. H. BILLMAN,
O. C. BILLMAN.